(12) United States Patent
Hwang et al.

(10) Patent No.: US 12,152,171 B2
(45) Date of Patent: Nov. 26, 2024

(54) COMPOSITION COMPRISING RECYCLED RESIN AND ETHYLENE-ACRYLIC ACID COPOLYMER AND PREPARATION METHOD THEREOF

(71) Applicants: SK Innovation Co., Ltd., Seoul (KR); SK Geo Centric Co., Ltd., Seoul (KR)

(72) Inventors: Bu Yeon Hwang, Seoul (KR); Sang Ha Son, Seoul (KR); Dong Hyun Woo, Seoul (KR); Ji Hyeon Choi, Seoul (KR)

(73) Assignees: SK Innovation Co., Ltd., Seoul (KR); SK Geo Centric Co., Ltd., Seoul (KR)

(*) Notice: Subject to any disclaimer, the term of this patent is extended or adjusted under 35 U.S.C. 154(b) by 0 days.

(21) Appl. No.: 18/354,989

(22) Filed: Jul. 19, 2023

(65) Prior Publication Data
US 2024/0199926 A1    Jun. 20, 2024

(30) Foreign Application Priority Data

Dec. 15, 2022  (KR) .................. 10-2022-0176075

(51) Int. Cl.
   *C09J 123/08*   (2006.01)
   *C09J 201/00*   (2006.01)

(52) U.S. Cl.
   CPC ....... *C09J 123/0869* (2013.01); *C09J 201/00* (2013.01); *C09J 2301/312* (2020.08); *C09J 2301/50* (2020.08)

(58) Field of Classification Search
   CPC .............. C09J 123/0869; C09J 201/00; C09J 2301/312; C09J 2301/50
   See application file for complete search history.

(56) References Cited

U.S. PATENT DOCUMENTS

| 4,292,463 A | 9/1981 | Bow et al. |
| 11,685,845 B1 * | 6/2023 | Leeds .................... C09J 123/10 525/240 |
| 2022/0177681 A1 | 6/2022 | Briggs et al. |

FOREIGN PATENT DOCUMENTS

| CN | 109575855 A | 4/2019 |
| KR | 20070109493 A | * 11/2007 |
| KR | 1020070109493 A | 11/2007 |

OTHER PUBLICATIONS

Lee et al., "A novel separation process for recycling of post-consumer products", CIRP Annals—Manufacturing Technology, 2012, pp. 35-38, vol. 61, Elsevier.

* cited by examiner

*Primary Examiner* — Daniel H Lee
(74) *Attorney, Agent, or Firm* — The Webb Law Firm

(57) ABSTRACT

Provided is an adhesive composition including an ethylene-acrylic acid copolymer and a post-consumer recycled resin (PCR), wherein the ethylene-acrylic acid copolymer has a melt index (190° C., 2.16 kg, ASTM D1238) of 1 to 30 g/10 min, and the PCR has a melt index (190° C., 2.16 kg, ASTM D1238) of 1 to 10 g/10 min, and a preparation method thereof, which can have excellent processability, low gel content, and excellent adhesive strength by easily distinguishing a certain level of PCR resin by a capillary rheometer and mixing the PCR resin with an ethylene-acrylic acid copolymer.

10 Claims, 1 Drawing Sheet

COMPOSITION COMPRISING RECYCLED RESIN AND ETHYLENE-ACRYLIC ACID COPOLYMER AND PREPARATION METHOD THEREOF

CROSS-REFERENCE TO RELATED APPLICATION

This application claims priority to Korean Patent Application No. 10-2022-0176075, filed Dec. 15, 2022, the disclosure of which is hereby incorporated by reference in its entirety.

BACKGROUND OF THE INVENTION

Field of the Invention

The following disclosure relates to a composition comprising a recycled resin and an ethylene-acrylic acid copolymer, and a preparation method thereof.

Description of Related Art

A post consumer resin (PCR) means a recycled resin, and currently, research on recycling it has been continuously conducted. The PCR is a polymer resin such as polyethylene (PE), polyethylene terephthalate (PET), polypropylene (PP), vinyl chloride (PVC), and/or polystyrene (PS), and the polymer resin is mainly used for clothing, carpets, bottles, plastic wood, pipes, floor tiles, packaging, and textiles, etc., and accordingly, the amount of PCR produced has increased year by year. By recycling, environmental pollution is reduced. For example, as plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change. Therefore, it is desirable to provide a product, such as an adhesive composition, that is prepared from PCR to reduce waste and/or ameliorate the release of greenhouse gases into the environment by decomposition and/or incineration of the PCR.

Among the PCR materials, the wrapping paper used for packaging goods in supermarkets among polyethylene (PE) resins is bulky and may secure a large amount of resin with the same properties, so research on recycling it has been continuously conducted.

In particular, research has been conducted to provide an adhesive composition by mixing an ethylene-acrylic acid resin with the polyethylene PCR. However, the polyethylene PCR generally has lower physical properties and processability than those of new polymer resins, making it difficult to reuse it. In particular, there is a problem in that due to foreign matter remaining in the polyethylene PCR resin after processing, physical properties are greatly deteriorated, the polyethylene PCR and the ethylene-acrylic acid copolymer are not uniformly mixed, and in particular, adhesive properties to a substrate are also deteriorated.

Accordingly, among the collected polyethylene PCR resins, it is necessary to differentiate and classify them into grade A resins that may be mixed uniformly with ethylene-acrylic acid copolymers and grade C resins that cannot be recycled. However, there is a disadvantage that it is difficult to distinguish the grade A and grade C PCRs with the naked eye, ICP elemental analysis, TGA pyrolysis analysis, etc., and the cost for such analysis is also high.

SUMMARY OF THE INVENTION

An embodiment of the present invention is directed to providing an adhesive composition having excellent adhesive properties and physical properties, comprising an ethylene-acrylic acid copolymer and a PCR resin.

Another embodiment of the present invention is directed to providing an adhesive composition comprising a grade A PCR resin with a small content of foreign matter that is easily identified using a capillary rheometer device.

In one general aspect, there is provided an adhesive composition, comprising a) an ethylene-acrylic acid copolymer and b) a post-consumer recycled resin (PCR), wherein a) the ethylene-acrylic acid copolymer has a melt index (190° C., 2.16 kg, ASTM D1238) of 1 to 30 g/10 min, and b) the PCR has a melt index (190° C., 2.16 kg, ASTM D1238) of 1 to 10 g/10 min.

The melt index of the ethylene-acrylic acid copolymer and the PCR may satisfy the following Equation 1:

$$MI_1 - MI_2 \leq 20 \quad \text{[Equation 1]}$$

wherein $MI_1$ is a melt index of the ethylene-acrylic acid copolymer, and $MI_2$ is a melt index of the PCR.

When the PCR is passed through a capillary rheometer, the PCR may satisfy the following Equation 2:

$$\frac{P_t - P_A}{T_R - T_A} \leq 0.2 \quad \text{[Equation 2]}$$

wherein $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

When the PCR is passed through a capillary rheometer, the PCR may satisfy the following Equation 3:

$$\frac{P_t - P_A}{T_R - T_A} \leq 0.1 \quad \text{[Equation 3]}$$

wherein $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

The adhesive composition may have a PCR resin content of 20 to 70% by weight.

The adhesive composition may have an adhesive strength of 800 gf/in or more with an aluminum plate.

The adhesive composition may have an adhesive strength of 1,000 gf/in or more with an aluminum plate.

The adhesive composition may have a melt index (190° C., 2.16 kg) of 1 to 20 g/10 min.

In another general aspect, there is provided a preparation method of an adhesive composition, comprising: S1) preparing a polymer mixture by mixing an ethylene-acrylic acid copolymer having a melt index (190° C., 2.16 kg, ASTM D1238) of 1 to 30 g/10 min and a post-consumer recycled resin (PCR) having a melt index (190° C., 2.16 kg, ASTM D1238) of 1 to 10 g/10 min; S2) melt-extruding the polymer mixture; and S3) preparing the extruded mixture into a pellet through a pelletizer.

The melt index of the ethylene-acrylic acid copolymer and the PCR may satisfy the following Equation 1:

$$MI_1 - MI_2 \leq 20 \quad \text{[Equation 1]}$$

wherein $MI_1$ is a melt index of the ethylene-acrylic acid copolymer, and $MI_2$ is a melt index of the PCR.)

When the PCR is passed through a capillary rheometer, the PCR may satisfy the following Equation 2:

$$\frac{P_t - P_A}{T_R - T_A} \leq 0.2 \quad \text{[Equation 2]}$$

wherein $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g·A temperature of the melt extrusion in S2) may be 150 to 300° C.

DESCRIPTION OF THE INVENTION

Figure 1:
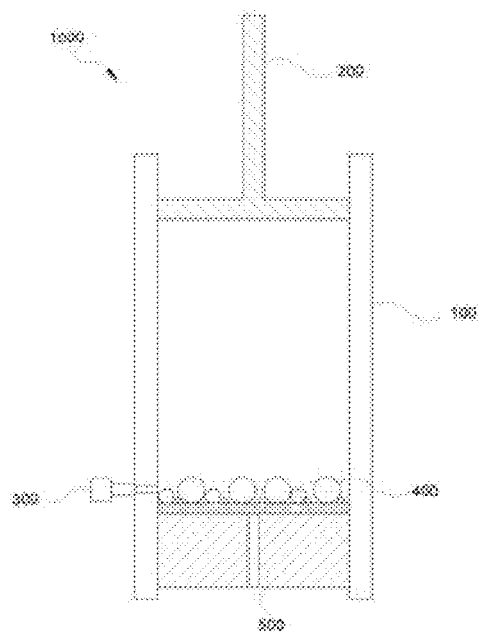
FIG. 1 is a schematic diagram of a capillary rheometer device.
Figure 2:
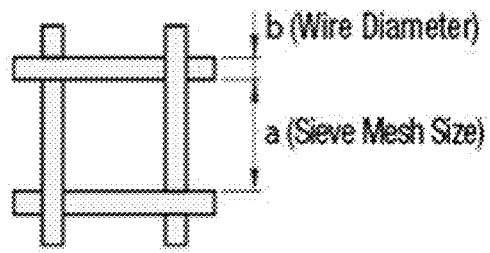
FIG. 2 is a schematic diagram of a mesh of a capillary rheometer device.

Hereinafter, the present disclosure will be described in more detail with reference to embodiments and examples including accompanying drawings. The following specific examples and embodiments are only a reference for describing the present disclosure in detail, and the present disclosure is not limited thereto, and may be implemented in various forms.

Numerical ranges used herein include a lower limit, an upper limit, and all values within that range, increments that are logically derived from the type and width of the defined range, all double-defined values, and all possible combinations of upper and lower limits of numerical ranges defined in different forms. Unless otherwise defined herein, values outside the numerical range that may arise due to experimental errors or rounded values are also included in the defined numerical range.

In addition, all technical terms and scientific terms have the same meanings as those commonly understood by a person skilled in the art to which the present disclosure pertains unless otherwise defined. The terms used in the description of the present disclosure are only for effectively describing certain embodiments, and are not intended to limit the present disclosure.

In addition, singular forms used in the detailed description and the claims are intended to include the plural forms unless otherwise indicated in context.

In addition, unless explicitly described otherwise, "comprising" or "including" any component will be understood to imply the inclusion of other components rather than the exclusion of other components.

The present disclosure provides an adhesive composition comprising a) an ethylene-acrylic acid copolymer and b) a post-consumer recycled resin (PCR), wherein a) the ethylene-acrylic acid copolymer has a melt index (190° C., 2.16 kg, ASTM D1238) of 1 to 30 g/10 min, and b) the PCR has a melt index (190° C., 2.16 kg, ASTM D1238) of 1 to 10 g/10 min, and thus, the adhesive composition has excellent miscibility and excellent adhesive properties.

As used herein, "post consumer resin (PCR)" means a recycled resin or recycled polymer resin, non-limiting examples of which comprise polyethylene (PE), polyethylene terephthalate (PET), polypropylene (PP), vinyl chloride (PVC), and/or polystyrene (PS).

The acrylic acid content may be 1% by weight or more, 3% by weight or more, 5% by weight or more, 10% by weight or more, or 15% by weight or more as a lower limit, and 50% by weight or less, 40% by weight or less, 30% by weight or less, 25% by weight or less, or 20% by weight or less as an upper limit, or 1 to 30% by weight, or 3 to 25% by weight, or 5 to 20% by weight, based on the total weight of the ethylene-acrylic acid copolymer, but the present invention is not limited thereto.

In addition, the ethylene-acrylic acid copolymer may have a weight average molecular weight of 10,000 g/mol or more, 20,000 g/mol or more, 30,000 g/mol or more, 50,000 g/mol or more, or 70,000 g/mol or more as a lower limit, and 1,000,000 g/mol or less, 800,000 g/mol or less, 500,000 g/mol or less, or 300,000 g/mol or less as an upper limit, or 30,000 to 1,000,000 g/mol, or 30,000 to 500,000 g/mol, and specifically or 70,000 to 300,000 g/mol, based on the total weight of the ethylene-acrylic acid copolymer, but the present invention is not limited thereto.

In addition, the ethylene-acrylic acid copolymer may have a molecular weight distribution (polydispersity index, PI) of 2 or more, 3 or more, or 5 or more as a lower limit, and 20 or less, 15 or less, or 10 or less as an upper limit, or 2 to 15, or 3 to 10, or 5 to 10, but the present invention is not limited thereto.

Further, the ethylene-acrylic acid copolymer may have a melt index (190° C./2.16 kg, ASTM D 1238) of 3 g/10 min or more or 5 g/10 min or more as a lower limit, and 50 g/10 min or less, 40 g/10 min or less, 30 g/10 min or less, 25 g/10 min or less, 20 g/10 min or less, 15 g/10 min or less, or 10 g/10 min or less as an upper limit, or 3 to 50 g/10 min, or 5 to 30 g/10 min, or 5 to 20 g/10 min, or 5 to 15 g/10 min, or 5 to 10 g/10 min, but the present invention is not limited thereto.

In an embodiment, the PCR may have a melt index (190° C./2.16 kg, ASTM D 1238) of 1 g/10 min or more, 2 g/10 min or more, or 3 g/10 min or more as a lower limit, and 30 g/10 min or less, 25 g/10 min or less, 20 g/10 min or less, 15 g/10 min or less, 10 g/10 min or less, or 5 g/10 min or less as an upper limit, or 1 to 30 g/10 min, or 1 to 20 g/10 min, or 2 to 10 g/10 min, or 3 to 5 g/10 min as an upper limit, but the present invention is not limited thereto.

The ethylene-acrylic acid copolymer and PCR may be mixed with a certain difference in melt index values.

In an embodiment, a melt index of the ethylene-acrylic acid copolymer and the PCR may satisfy the following Equation 1, wherein the upper limit of the melt index may be 20 g/10 min or less, 19 g/10 min or less, 18 g/10 min or less, 17 g/10 min or less, 16 g/10 min or less, 15 g/10 min or less, 13 g/10 min or less, 12 g/10 min or less, 10 g/10 min or less, or 8 g/10 min or less, and the lower limit of the melt index may be 1 g/10 min or more, 2 g/10 min or more, 3 g/10 min or more, 4 g/10 min or more, may be 5 g/10 min or more, or 1 to 20 g/10 min, or 1 to 10 g/10 min, or 3 to 8 g/10 min, but the present invention is not limited thereto:

$$MI_1 - MI_2 \leq 20. \qquad \text{[Equation 1]}$$

wherein, $MI_1$ is a melt index of the ethylene-acrylic acid copolymer, and $MI_2$ is a melt index of the PCR.

As a difference in the melt indices between the ethylene-acrylic acid copolymer and the PCR satisfies the above range, there is an advantage in that the miscibility is excellent and the adhesive properties are also excellent.

Among the conventionally collected PCR resins, in the case of a grade C PCR having a high content of foreign matter, miscibility with the ethylene-acrylic acid copolymer is deteriorated, problems such as deterioration in quality during extrusion or clogging of an extrusion nozzle due to excessive foreign matter may occur, and adhesive strength of the adhesive composition mixed with the grade C PCR and the ethylene-acrylic acid copolymer may also be reduced.

Accordingly, among the collected PCR resins, it is necessary to differentiate and classify them into grade A resin having a low content of foreign matter and grade C resin having a high content of foreign matter. However, there is a disadvantage that it is difficult to distinguish the grade A and grade C PCRs with the naked eye, ICP elemental analysis, TGA pyrolysis analysis, etc., and the cost for such analysis is also high.

Thus, the present disclosure provides a method for easily distinguishing the grade-A PCR using a capillary rheometer device.

In an embodiment, when the PCR is passed through a capillary rheometer, the PCR may satisfy the following Equation 2 and/or Equation 3, and the PCR has very excellent miscibility with ethylene-acrylic acid copolymer, and in which case the adhesive composition disclosed herein has excellent physical properties, such as but not limited to adhesive properties, and continuous extrusion is possible without clogging during extrusion, and the physical properties of the article discharged from the extruder are also uniform.

$$\frac{P_t - P_A}{T_R - T_A} \leq 0.2 \qquad \text{[Equation 2]}$$

$$\frac{P_t - P_A}{T_R - T_A} \leq 0.1 \qquad \text{[Equation 3]}$$

wherein $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

Through a PCR measurement method in which the extrusion molding is easy, it is possible to easily identify high-quality PCR materials that may be continuously extruded among the collected PCRs without special analysis and devices.

However, in the case of PCR with a very small content of foreign matter, the mesh is not destroyed because there are no foreign matter accumulated until all of the PCR inside the capillary rheometer device is discharged. That is, if the mesh is not destroyed, it is a clean grade A PCR with almost no foreign matter content.

FIG. 1 is a view illustrating a capillary rheometer of the present disclosure, and FIG. 1 is only an example for explaining the capillary rheometer of the present disclosure, which is not limited to the configuration of FIG. 1.

The capillary rheometer device 1000 is composed of a cylinder body 100, a piston 200, a pressure measuring instrument 300, a mesh 400, and a capillary die 500, but additional components may be added as needed.

After adding the PCR material to the capillary rheometer device 1000 and raising a temperature of the cylinder body 100 until it melts, the piston 200 is pushed at a constant speed to discharge the molten PCR through the capillary tube of the capillary die 500.

The mesh 400 is installed under the cylinder body 100, and when the molten PCR is discharged, the pressure inside the cylinder body 100 rises while foreign matter inside the PCR clog the holes of the mesh. Here, as the content of the foreign matter increases, the pressure rises rapidly even when the piston 200 is slightly pressed, and the mesh may burst when excessive pressure is applied. Equation 1 and Equation 2 may distinguish high-grade or low-grade PCR by measuring the slope of the pressure and the time until the mesh bursts.

The specific specifications of the capillary rheometer device have been described in detail above, and thus will be omitted here.

In an embodiment, the adhesive composition may have a PCR resin content of 10% by weight or more, 15% by weight or more, 20% by weight or more, 25% by weight or more as a lower limit, and 90% by weight or less, 80% by weight or less, 70% by weight or less, 60% by weight or less, 50% by weight or less, or 40% by weight or less as an upper limit, or 20 to 70% by weight, or 20 to 60% by weight, or 25 to 50% by weight, or 25 to 40% by weight, but the present invention is not limited thereto.

As the PCR content satisfies the above range, the adhesive composition has excellent economic efficiency and also has excellent mechanical properties and adhesive properties.

In an embodiment, the adhesive composition may have adhesive strength with aluminum foil or aluminum plate of 800 gf/in or more, or 900 gf/in or more, or 1,000 gf/in or more, or 1,100 gf/in or more, or 1,200 gf/in or more, or 1,000 to 1,300 gf/in, or 1,000 to 1,200 gf/in, but the present invention is not limited thereto.

In an embodiment, the adhesive composition may have a melt index (190° C., 2.16 kg, ASTM D1238) of 20 g/10 min or less, 19 g/10 min or less, 18 g/10 min or less, 17 g/10 min or less, 16 g/10 min or less, 15 g/10 min or less, 13 g/10 min or less, 12 g/10 min or less, 10 g/10 min or less, or 8 g/10 min or less as an upper limit, and 1 g/10 min or more, 2 g/10 min or more, 3 g/10 min or more, 4 g/10 min or more, or 5 g/10 min or more as a lower limit, or 1 to 20 g/10 min, or 1 to 10 g/10 min, or 3 to 8 g/10 min, but the present invention is not limited thereto.

As the melt index of the adhesive composition satisfies the above range, the adhesive composition has excellent processability and excellent adhesive properties.

In addition, the adhesive composition may further comprise an additive, and examples thereof may further comprise, but are not limited to, for example, an antioxidant, for example Irganox 1010 pentaerythritol tetrakis(3-(3,5-di-tert-butyl-4-hydroxyphenyl)propionate) antioxidant, a stabilizer, for example Irgafos 168 tris(2,4-di-tert.-butylphenyl) phosphite stabilizer, and/or a plasticizer.

In an embodiment, the preparation method of the adhesive composition is not limited thereto as long as it is a preparation method of an adhesive composition comprising a conventional ethylene-acrylic acid copolymer. For example, after dry blending the PCR and the ethylene-acrylic acid copolymer, the mixture was again extruded by melt blending using a twin extruder.

Thereafter, water cooling may be performed to obtain a mixture in the form of pellets through a pelletizer (cutter). The extrusion temperature may be 180 to 220° C., but the present invention is not limited thereto.

In an embodiment, the mixed adhesive composition may be prepared in a form of a film, but the present invention is not limited thereto. The film may be manufactured into a film through co-extrusion of the blended resin prepared above through an extrusion coating equipment or a casting equipment.

In an embodiment, the film may have a thickness of 1 to 200 μm, or 10 to 150 μm, 10 to 100 μm, or 20 to 80 μm, or 30 to 50 μm, but the present invention is not limited thereto.

A method is provided for reducing greenhouse gas emissions from an adhesive composition, comprising: preparing an adhesive composition, comprising a) an ethylene-acrylic acid copolymer and b) a post-consumer recycled resin (PCR), wherein the ethylene-acrylic acid copolymer has a melt index (190° C., 2.16 kg, ASTM D1238) of 1 to 30 g/10 min, and the PCR has a melt index (190° C., 2.16 kg, ASTM D1238) of 1 to 10 g/10 min.

Hereinafter, the present disclosure will be described in more detail on the basis of Examples and Comparative Examples. However, the following Examples and Comparative Examples are only examples for describing the present disclosure in more detail, and the present disclosure is not limited by the following Examples and Comparative Examples.

[PCR Resin Gradient Measurement]

The PCR resin slope was measured through the following slope K Equation:

$$\frac{P_t - P_A}{T_R - T_A} \leq K \qquad \text{[Slope K Equation]}$$

wherein $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

[Adhesive Strength Measurement]

The adhesive strength of the sample was evaluated according to ASTM D3330. The laminate film was cut to a size of 1 inch in width and peeled between the aluminum and the PCR-EAA blended film. The sample was attached to a flat SUS stainless steel plate, such as SUS 304, and the peel strength between aluminum and the peeled PCR-EAA Blended film was measured using UTM equipment. Peeling conditions were set at an angle of 180 degrees in a MD direction and a speed of 50 mm/min.

[Melting Index]

The melt index was obtained by measuring the weight of the resin discharged for 10 minutes under the condition of 2.16 kg at 190° C. according to ASTM D1238.

Examples and Comparative Examples

To a mixture mixed in the weight ratio of the mixture of EAA and PCR described in Tables 1 to 3 below, 0.01 parts by weight of Irganox 1010 as an antioxidant and Irgafos 168 as a stabilizer were added to a mixing container (Planetary mixer (KURABO, KK-250s)), respectively, based on 100 parts by weight of the mixture, and stirred to prepare an adhesive composition.

In order to evaluate the adhesive strength of the PCR-EAA blender film with aluminum, the blended resin in a mixed state prepared above was extrusion coated on an aluminum fabric using an extrusion coating (EC) facility. The aluminum fabric had a thickness of 20 μm, and the PCR-EAA blend resin had an extrusion thickness of 40 μm, so a lamination film having a total thickness of 60 μm was manufactured. The extrusion temperature was 240 to 280° C.

TABLE 1

| | EAA | | PCR | | MI difference between PCR − EAAS | Appearance difference |
|---|---|---|---|---|---|---|
| | Sample | MI | Sample | MI | | |
| Example 1 | EAA_A (70%) | 5 | Sample C (30%) | 3.6 | 1.4 | ○ (film stability good) |
| Example 2 | EAA_B (70%) | 10 | | | 6.4 | ○ (film stability good) |
| Example 3 | EAA_C (70%) | 23 | | | 19.4 | ○ (film stability good) |
| Comp. Example 1 | EAA_D (70%) | 25 | | | 21.4 | X (No film to be manufactured) |
| Comp. Example 2 | EAA_E (70%) | 60 | | | 56.4 | X (No film to be manufactured) |
| Comp. Example 3 | EAA_F (70%) | 300 | | | 296.4 | X (No Film to be manufactured) |

*EAA_A has an AA content of 9.7% and a weight average molecular weight of 90,000 to 110,000 g/mol.
EAA_B has an AA content of 9.7% and a weight average molecular weight of 90,000 to 100,000 g/mol.
EAA_C has an AA content of 13.5% and a weight average molecular weight of 70,000 to 80,000 g/mol.
EAA_D has an AA content of 13.5% and a weight average molecular weight of 60,000 to 70,000 g/mol.
EAA_E has an AA content of 13.5% and a weight average molecular weight of 50,000 to 60,000 g/mol.
EAA_F has an AA content of 20.5% and a weight average molecular weight of 20,000 to 30,000 g/mol.

TABLE 2

| | EAA | | PCR | | | Capillary rheometer slope of adhesive composition | AL adhesive strength (gf/in) |
|---|---|---|---|---|---|---|---|
| | Sample | Ratio | Sample | Ratio | Total | | |
| Example 2_A | EAA B | 100% | Sample C | (0%) | 100% | 0.001 | 1470 |
| Example 2_B | EAA B | 90% | Sample C | (10%) | 100% | 0.0028 | 1308 |
| Example 2_C | EAA B | 70% | Sample C | (30%) | 100% | 0.0074 | 1169 |
| Example 2_D | EAA B | 50% | Sample C | (50%) | 100% | 0.126 | 1087 |
| Example 2_E | EAA B | 30% | Sample C | (70%) | 100% | 0.183 | 1024 |
| Example 2_F | EAA B | 10% | Sample C | (90%) | 100% | 0.246 | 624 |
| Example 2_G | EAA B | 0% | Sample C | (100%) | 100% | 0.285 | 489 |

TABLE 3

| | EAA | PCR | Capillary rheometer slope of PCR | AL adhesive strength (gf/in) |
|---|---|---|---|---|
| Example 4 | EAA B (70%) | Sample A (30%) | 0.0077 | 1024 |
| Example 5 | | Sample B (30%) | 0.0099 | 1210 |
| Example 6 | | Sample C (30%) | 0.0285 | 1169 |
| Example 7 | | Sample D (30%) | 0.0657 | 1152 |
| Example 8 | | Sample E (30%) | 0.173 | 1056 |
| Example 9 | | Sample F (30%) | 0.3851 | 868 |
| Example 10 | | Sample G (30%) | 0.4305 | 845 |
| Example 11 | | Sample H (30%) | 0.5478 | 922 |
| Example 12 | | Sample I (30%) | 0.6324 | 997 |
| Example 13 | | Sample J (30%) | 0.8491 | 962 |

*Samples A to J were collected from hypermarkets, respectively.

Table 1 above is the result of setting a comparative group according to an MI difference between PCR and EAA based on the same LDPE, and evaluating the appearance through filming. Thus, it could de confirmed that the film stability was secured when the MI difference between the blended resins was 20 or less.

It could be confirmed from Table 2 that when a composition ratio of the recycled resin had a weight ratio of 10% to 70%, a blending resin having a gel level with a rheometer slope of 0.2 or less and adhesive properties of 1,000 gf/in or more may be manufactured.

Table 3 above shows numerical values quantifying the level of the foreign matter in the blending resin by securing discriminating data between low and high grade PCR using a Capillary Rheometer System. Specifically, it could be confirmed that the pressure that increases according to the elapsed time was quantified by the slope, and when the slope was 0.2 or less, there was no degradation of other physical properties including AL adhesive strength even after blending.

Figure 3A:
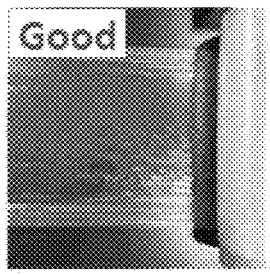
FIG. 3A is an image illustrating surface state of an adhesive film of Example 3.
Figure 3B:
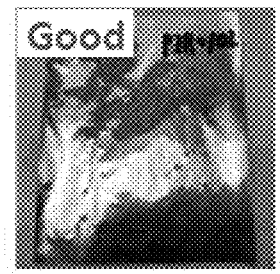
FIG. 3B is an image illustrating surface state of an adhesive film of Example 3.
Figure 3C:
FIG. 3C is an image illustrating surface state of an adhesive film of Comparative Example 1.
Figure 3D:
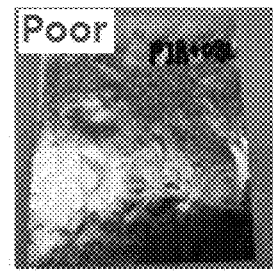
FIG. 3D is an image illustrating surface state of an adhesive film of Comparative Example 1.

FIGS. 3A-3D are images obtained by co-extruding the adhesive compositions 4 Example 3 (FIGS. 3A and 3B) and Comparative Example 1 (FIGS. 3C and 3D) with a film or aluminum foil. In Example 3, a film in an intact form was obtained as shown in FIG. 3A, but in Comparative Example 1, a film having low quality such as tearing was obtained by performing extrusion as shown in FIG. 3C.

The present disclosure may provide an adhesive composition having excellent processability, low gel content, and excellent adhesive strength by simply and easily distinguish-

What is claimed is:

1. An adhesive composition, comprising
 a) an ethylene-acrylic acid copolymer and
 b) a post-consumer recycled resin (PCR),
 wherein the ethylene-acrylic acid copolymer has a melt index (190° C., 2.16 kg, ASTM D1238) of 1 to 30 g/10 min, and the PCR has a melt index (190° C., 2.16 kg, ASTM D1238) of 1 to 10 g/10 min, and
 wherein when the PCR is passed through a capillary rheometer, the PCR satisfies the following equation:

$$\frac{P_t - P_A}{T_B - T_A} \leq 0.2$$

where $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

2. The adhesive composition of claim 1, wherein the melt index of the ethylene-acrylic acid copolymer and the melt index of the PCR satisfies the following equation:

$$MI_1 - MI_2 \leq 20$$

wherein, $MI_1$ is a melt index of the ethylene-acrylic acid copolymer, and $MI_2$ is a melt index of the PCR.

3. The adhesive composition of claim 1, wherein when the PCR is passed through a capillary rheometer, the PCR satisfies the following equation:

$$\frac{P_t - P_A}{T_B - T_A} \leq 0.1.$$

4. The adhesive composition of claim 1, wherein the adhesive composition has a PCR resin content of 20 to 70% by weight.

5. The adhesive composition of claim 1, wherein the adhesive composition has an adhesive strength of 800 gf/in or more with an aluminum plate.

6. The adhesive composition of claim 5, wherein the adhesive composition has an adhesive strength of 1,000 gf/in or more with an aluminum plate.

7. The adhesive composition of claim 1, wherein the adhesive composition has a melt index (190° C., 2.16 kg) of 1 to 20 g/10 min.

8. A preparation method for the adhesive composition of claim 1, comprising:
 S1) preparing a polymer mixture by mixing the ethylene-acrylic acid copolymer having a melt index (190° C., 2.16 kg, ASTM D1238) of 1 to 30 g/10 min and the post-consumer recycled resin (PCR) having a melt index (190° C., 2.16 kg, ASTM D1238) of 1 to 10 g/10 min;
 S2) melt-extruding the polymer mixture; and
 S3) preparing the extruded mixture into a pellet through a pelletizer.

9. The preparation method of an adhesive composition of claim 8, wherein a temperature of the melt extrusion in S2) is 150 to 300° C.

10. A method for reducing greenhouse gas emissions from an adhesive composition, comprising:
 preparing an adhesive composition, comprising
 a) an ethylene-acrylic acid copolymer and
 b) a post-consumer recycled resin (PCR),
 wherein the ethylene-acrylic acid copolymer has a melt index (190° C., 2.16 kg, ASTM D1238) of 1 to 30 g/10 min, and the PCR has a melt index (190° C., 2.16 kg, ASTM D1238) of 1 to 10 g/10 min, and
 wherein when the PCR is passed through a capillary rheometer, the PCR satisfies the following equation:

$$\frac{P_t - P_A}{T_B - T_A} \leq 0.2$$

where $T_A$ is the time at which the initial pressure is observed in the capillary rheometer, $T_B$ is the time at which a mesh is destroyed, $P_A$ is an initial pressure value at which the pressure is first measured by a pressure observer of the capillary rheometer, and $P_t$ means a pressure value just before a mesh is destroyed, wherein a capillary of the capillary rheometer used for measurement is 20 mm in diameter and 250 mm in length, a piston of the capillary rheometer is 15 mm in diameter, a capillary die of the capillary rheometer is 25 mm in length and a hole of the capillary rheometer is 2 mm in diameter so length/dimeter (L/D) is 25/2, the mesh is provided on the hole of the capillary rheometer, the mesh is 120 mesh, and a material of the mesh is SUS304 stainless steel, when a slope is measured, an internal temperature of the capillary rheometer is 190° C., a speed at which the piston is pushed down the capillary rheometer is 0.1 mm/s, and the amount of PCR introduced is 50 g.

* * * * *